April 24, 1928.  
R. CIZEK  
1,667,653  
SIGNALING DEVICE FOR VEHICLES  
Filed March 26, 1925
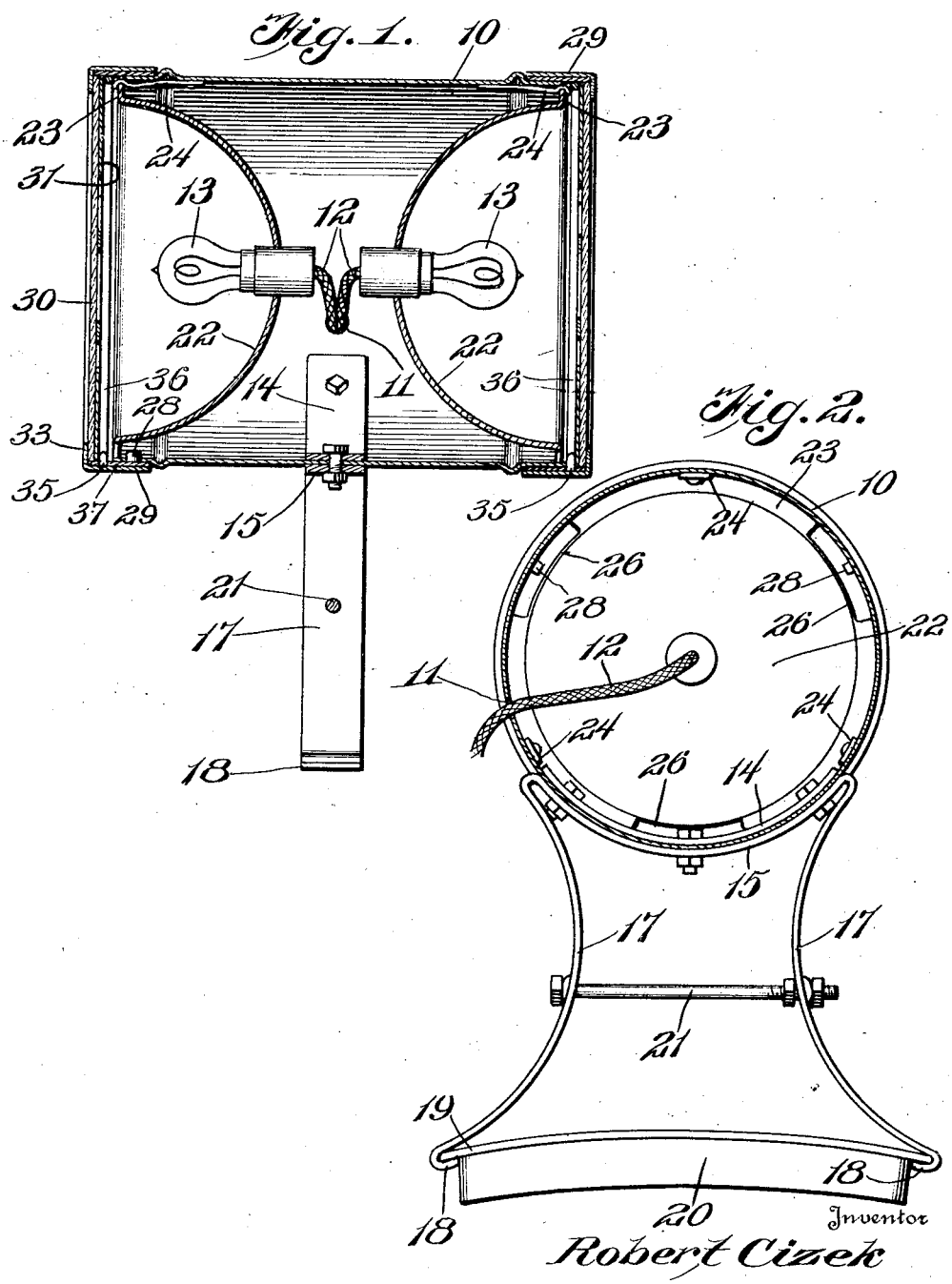
Inventor  
Robert Cizek  
By Watson E. Coleman  
Attorney Patented Apr. 24, 1928.

1,667,653

UNITED STATES PATENT OFFICE.

ROBERT CIZEK, OF FRANCIS CREEK, WISCONSIN.

SIGNALING DEVICE FOR VEHICLES.

Application filed March 26, 1925. Serial No. 18,578.

This invention relates to signaling devices for vehicles and more particularly to the construction thereof.

An important object of the invention is to provide in a signal means for mounting the reflector and lens retaining rim in such manner that it may be very solidly positioned and in such manner that the reflector will not interfere with the application of the lens rim to the device.

A further object of the invention is to provide a novel and improved rim construction having means for retaining a lens and, if desired, a stencil sheet in combination with the lens being positioned.

A still further object of the invention is the provision of a novel mounting bracket for the signal lamp permitting the mounting thereof upon the fenders of automobiles so that the device may be readily applied to either a closed or open car.

These and other objects I attain by the construction shown in the accompanying drawings, wherein for the purpose of illustration is shown a preferred embodiment of my invention and wherein:—

Figure 1 is a vertical sectional view through a signal constructed in accordance with my invention;

Figure 2 is a similar view taken at right angles to that shown in Figure 1.

Referring now more particularly to the drawings, the numeral 10 indicates a cylindrical barrel for the signal light, the ends of the barrel being open. Through the wall of the barrel intermediate the ends thereof, an opening 11 is formed to permit the passage of lead wires 12 for the illuminating elements 13 of the signal. Interiorly, the drum is provided centrally with a reinforcing strip 14 extending partially about the circumference thereof at the lower portion of the drum. Upon the exterior of the drum at this point, a band of resilient material such as strap spring steel, formed centrally to conform to the shaping of the drum, as indicated at 15, has such central portion secured through the wall of the drum to the reinforcing strip 15. The ends of this strip are bent downwardly and inwardly bowed, as indicated at 17, and the extremities of these ends are hooked, as at 18, to engage with the outstanding flanges 19 at the sides of a fender 20. Through the ends 17, a bolt 21 is directed by means of which the ends may be drawn toward one another to clamp the hooks against the fender and maintain the drum in position thereon.

It will be obvious that a device of this character may be readily secured to the vehicle as by loosening the bolt 21, the arms formed by the end of the strip may separate to admit the fender therebetween, so that when the bolt is retightened, the hooks will engage beneath the flanges of the fender and securely hold the lamp thereto without the formation of any holes in the fender.

Since the construction hereinbefore set forth is capable of a certain range of change and modification without materially departing from the spirit of the invention, I do not limit myself to such specific structure except as hereinafter claimed.

I claim:—

In a support for attaching signal lights to the fenders of vehicles, a single strip of resilient material having its central portion shaped to conform to the shaping of the wall of the signal light means for securing the strip to a signal light, the ends of the strip standing downwardly and diverging from one another and having opposed hooks formed upon their lower ends and means engaging the legs intermediate the ends thereof for constricting the legs to draw the hooks to one another to engage with the opposite side edges of the fender.

In testimony whereof I hereunto affix my signature.

ROBERT CIZEK.